Jan. 25, 1927.
G. DUMAS
1,615,260
PROCESS FOR THE MANUFACTURE OF FUSED CEMENT AND APPARATUS THEREFOR
Filed Jan. 15, 1924
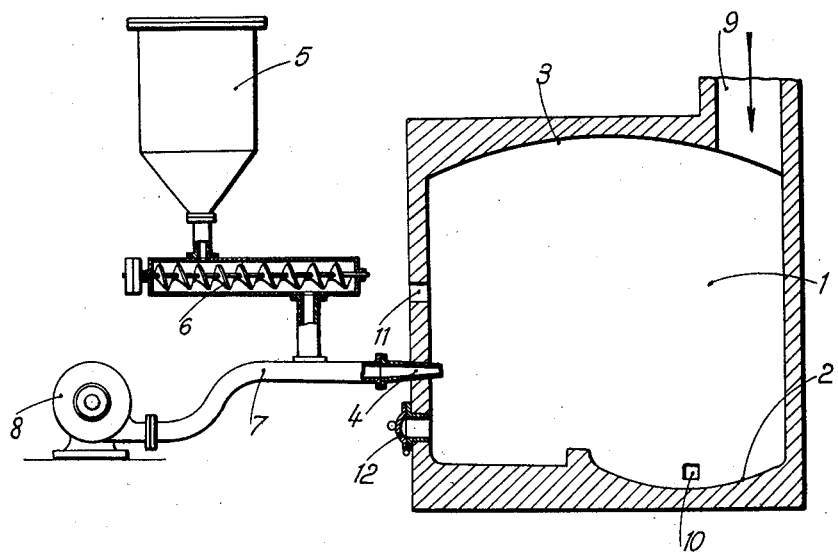

Patented Jan. 25, 1927.

1,615,260

UNITED STATES PATENT OFFICE.

GEORGES DUMAS, OF VIVIERS, FRANCE, ASSIGNOR TO THE SOCIÉTÉ ANONYME DES CHAUX ET CIMENTS DE LAFARGE ET DU TEIL, OF VIVIERS, ARDECHE, FRANCE, A CORPORATION OF FRANCE.

PROCESS FOR THE MANUFACTURE OF FUSED CEMENT AND APPARATUS THEREFOR.

Application filed January 15, 1924, Serial No. 686,461, and in France September 29, 1923.

The subject of this invention is a process and an apparatus intended for producing cement by fusion. It is particularly applicable to the manufacture of aluminous cement, which it produces by continuous working with an economic production which the processes ordinarily employed cannot touch.

The invention rests on the rational utilization of a type of furnace which in itself is known but which is slightly modified and supplemented by auxiliary apparatus making continuous working possible. It is a furnace having a hearth of suitable shape heated by pulverized coal such for example as the reverberatory furnace generally used in metallurgy for intermittent operations consisting in treating integrally a bed in fusion before drawing and proceeding to a new charge.

In the application of this furnace to the manufacture of fused cement the operation is carried out in accordance with the invention in a continuous manner by adding to the furnace a charging arrangement which ensures uninterrupted feeding.

This continuous working can naturally not be carried out except on the condition of causing, by a method of rational heating, a rapid fusion of the mixture of materials to be treated in proportion as they reach the hearth of the furnace. For this purpose the heating is effected by the injection of a gaseous, liquid or pulverized fuel which is burnt in the chamber of the furnace where the intense heat supplied by the flame and radiated by the arch causes the rapid fusion which is desired.

The accompanying drawing shows by way of example and in a diagrammatic form the aggregate of an installation intended for putting the process into practice.

The combustion chamber 1 of carefully calculated dimensions comprises particularly a hearth 2 surmounted by an arch 3 both constructed of suitable refractory materials. 4 represents in section one or more combined tuyères for the injection of the supporter of combustion and of the fuel, which, in the example in question, is pulverized coal collected in the hopper 5 and fed by the regulating screw 6 into the delivery pipe 7 of the fan 8 which blows it into the furnace through the tuyères 4. The material to be fused, heated by the burnt gases which escape from the furnace, is continually poured on to the hearth 2 through the opening 9 either by gravity or by any mechanical means. A tapping hole 10 is arranged in the hearth 2 at a suitable height for running off the fused cement. Finally, inspection holes 11 and a door 12 suitably located for inspecting and poking allow of the fusion being watched and modified at every moment which is a valuable advantage not possessed by the processes hitherto in use.

In an oven of the type described the process has been applied with success and in a continuous manner. The mixture to be introduced in the oven was made up of 100 kilogs. of bauxite for a 110 kilogs. of lime stone, each of them was separately crushed before mixing. The feeding was continuous, and the speed of feeding was controlled in order to maintain in the oven a mound of conical shape of uniform height. The whole of the charge was transformed into fused cement, which flowed in a continuous manner. The amount of fused cement produced in 24 hours was of 16 tons, the expenditure of pulverized coal was below 350 kilogs. per ton of fused cement. The temperature during the working was, at the interior of the oven, of about 1500° centigrade.

Other advantages result from the continuous working of the reverberatory furnace, that is to say:

(a) High thermal efficiency of the apparatus as above described for the fusion of aluminous cement by the complete utilization of the fuel and the perfect recovery of the heat of the burnt gases part of which may be used for heating the air required for combustion;

(b) Considerable reduction of labour;

(c) Intensified production ensuring a homogeneous product and reducing working costs.

It is to be understood as has been already mentioned that the constructive details given above are only diagrammatic examples. The scope of the invention will not be departed from by modifying the accessory apparatus provided that the essential characteristics constituted by a reverberatory furnace are maintained, said furnace being fed by an automatic charging apparatus working continuously.

I claim:

1. Process of obtaining fused cement in reverberatory furnaces, particularly aluminous cement, which comprises continuously feeding cement forming materials on to the hearth of a reverberatory furnace, from a substantial distance thereabove, melting said materials by impinging burning fuel thereon, and allowing the fused cement to flow away.

2. Process of obtaining fused cement in reverberatory furnaces, particularly aluminous cement, which comprises continuously feeding cement forming materials on to the hearth of a reverberatory furnace from a substantial distance thereabove, melting said materials by impinging burning fuel thereon, maintaining said fused cement under exposure of the heat produced by the burning fuel and allowing it to flow away.

In testimony whereof I hereunto affix my signature.

GEORGES DUMAS. [L. S.]